United States Patent [19]

Kawamura et al.

[11] Patent Number: 5,130,974
[45] Date of Patent: Jul. 14, 1992

[54] MULTIDROP CONTROL NETWORK COMMONLY USED FOR CARRYING NETWORK MANAGEMENT SIGNALS AND TOPOLOGY RECONFIGURATION SIGNALS

[75] Inventors: Hajime Kawamura; Keisuke Kuroyanagi, both of Tokyo, Japan

[73] Assignee: NEC Corporation, Tokyo, Japan

[21] Appl. No.: 501,804

[22] Filed: Mar. 30, 1990

[30] Foreign Application Priority Data

Mar. 30, 1989 [JP] Japan .................................. 1-76722

[51] Int. Cl.⁵ ........................ H04J 3/14; H04M 7/06
[52] U.S. Cl. ...................................... 360/16; 370/54; 370/59; 379/221; 340/827
[58] Field of Search ............... 370/16, 54, 58.1, 58.2, 370/58.3, 59, 63, 55; 379/219, 220, 221, 271, 272, 273; 340/825.03, 826, 827

[56] References Cited

U.S. PATENT DOCUMENTS

| | | | |
|---|---|---|---|
| 4,516,237 | 5/1985 | Perry et al. | 370/63 |
| 4,704,724 | 11/1987 | Krishnan et al. | 379/221 |
| 4,862,496 | 8/1989 | Kelly et al. | 340/827 |
| 4,875,208 | 10/1989 | Furuhashi et al. | 370/60 |
| 4,884,263 | 11/1989 | Suzuki | 370/69 |
| 4,991,204 | 2/1991 | Yamamoto et al. | 379/221 |

*Primary Examiner*—Douglas W. Olms
*Assistant Examiner*—Alpus H. Hsu
*Attorney, Agent, or Firm*—Foley & Lardner

[57] ABSTRACT

A data communication system comprises a network management center and switching nodes which are interconnected by regular and spare routes. Each of the regular and spare routes comprises data channels and a control channel, the data channels of the regular routes forming a data network for carrying signals to and from user terminals and the control channel of each regular or spare route is connected to the control channels of other regular or spare routes to form a control network of multidrop structure for carrying a network management signal from the center to the nodes as well as network response signals from the nodes to the center. Each of the nodes transmits a request signal through the control network in the event of a line fault in the transmission lines to request permission to establish a new regular route to an adjacent node and transmits a grant signal through the control network in response to receipt of a request signal from an adjacent node indicating that the request is granted if an alternate route is available. The control network is dynamically reconfigured in accordance with the presence and absence of the request signal and the grant signal received from adjacent nodes.

11 Claims, 9 Drawing Sheets

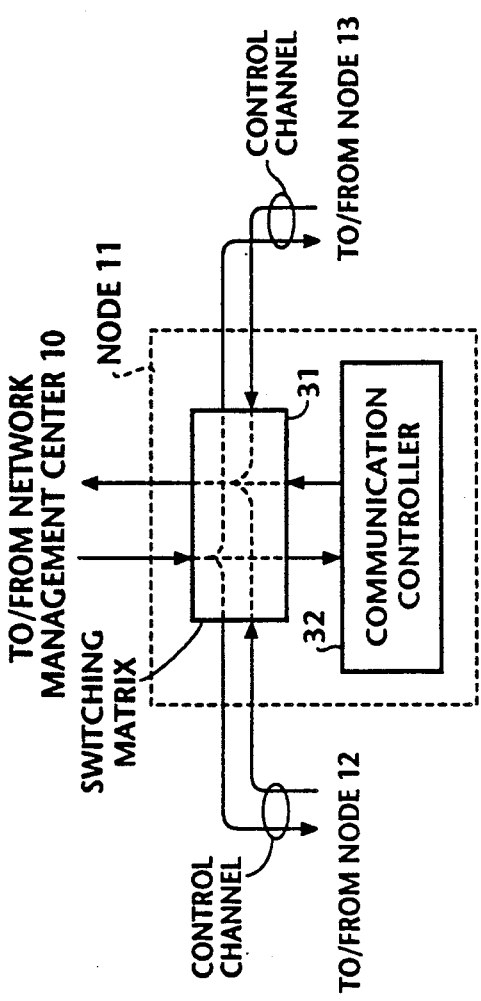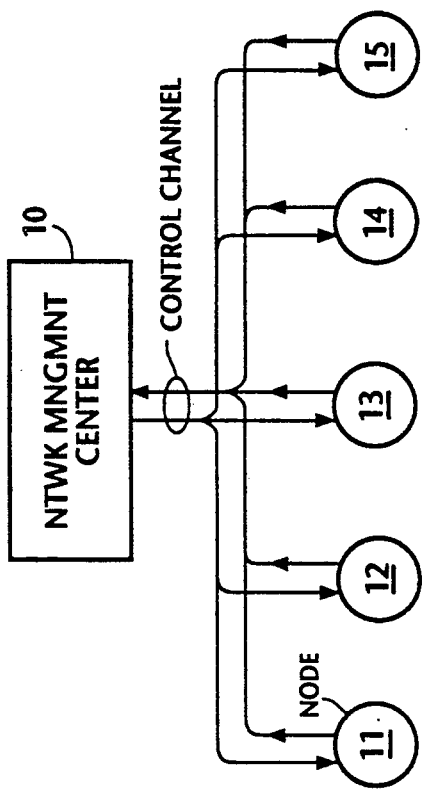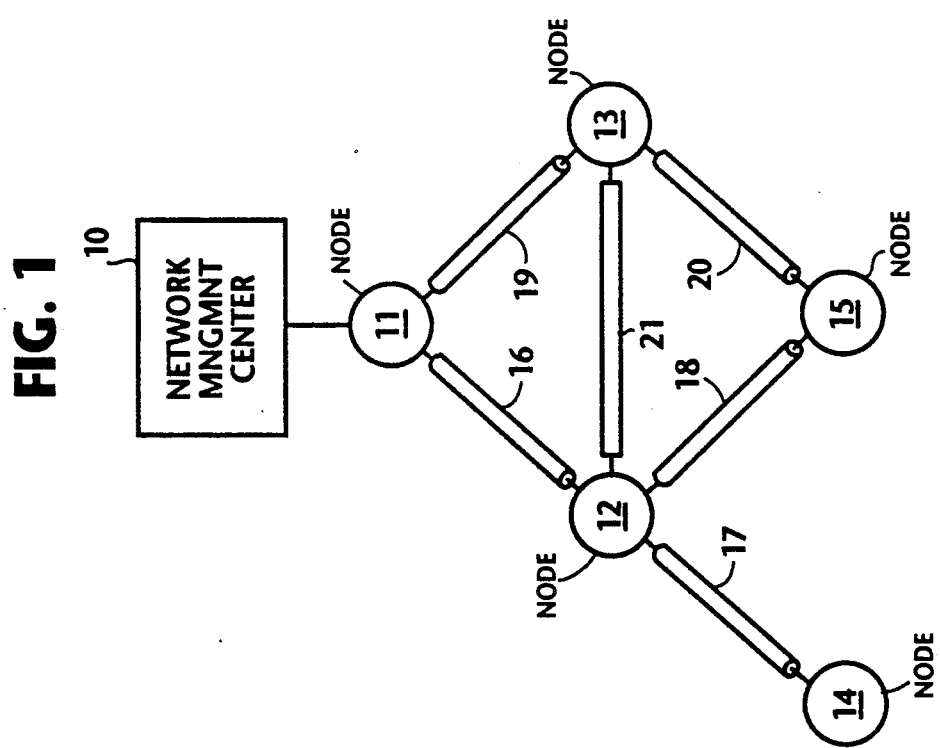

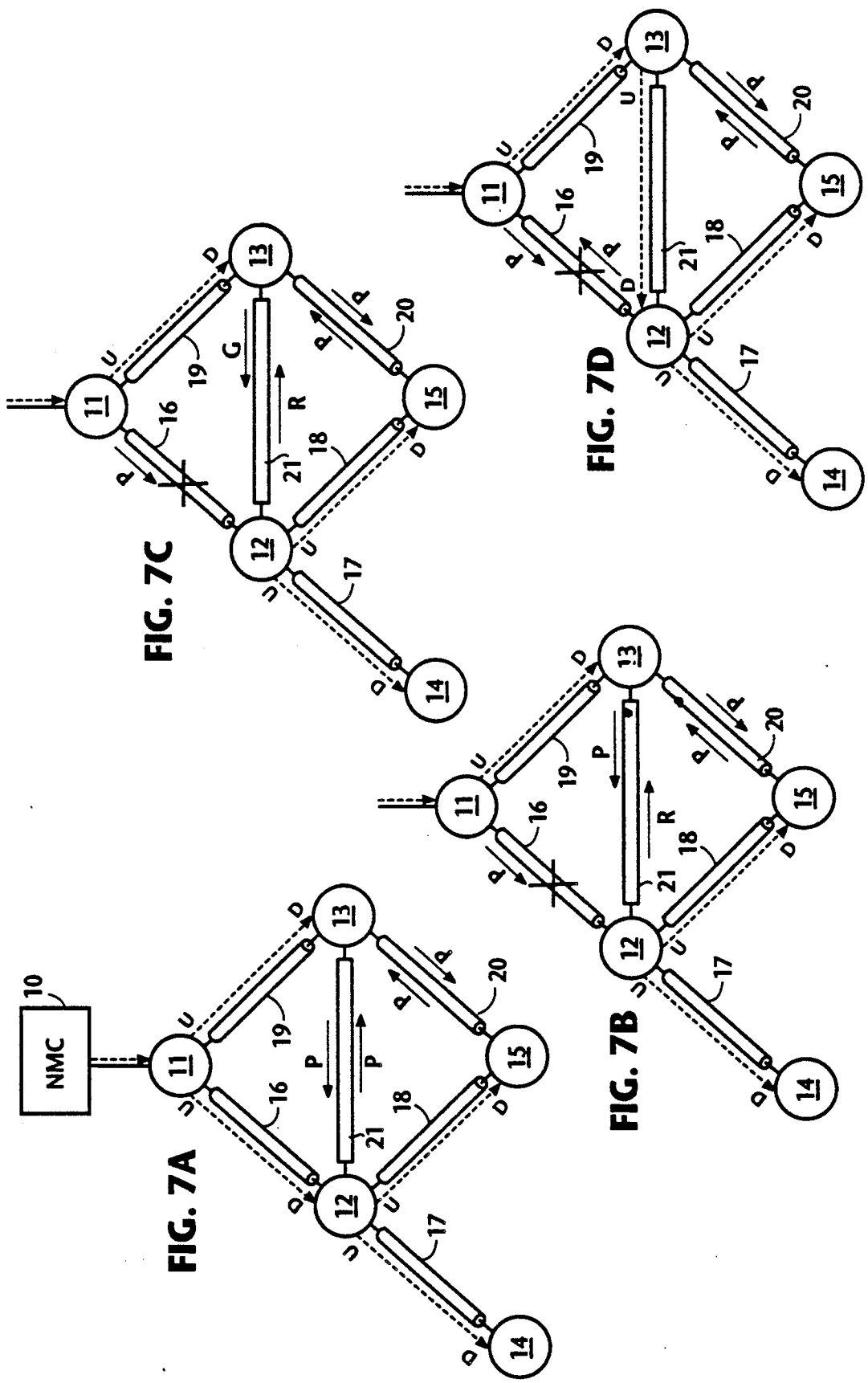

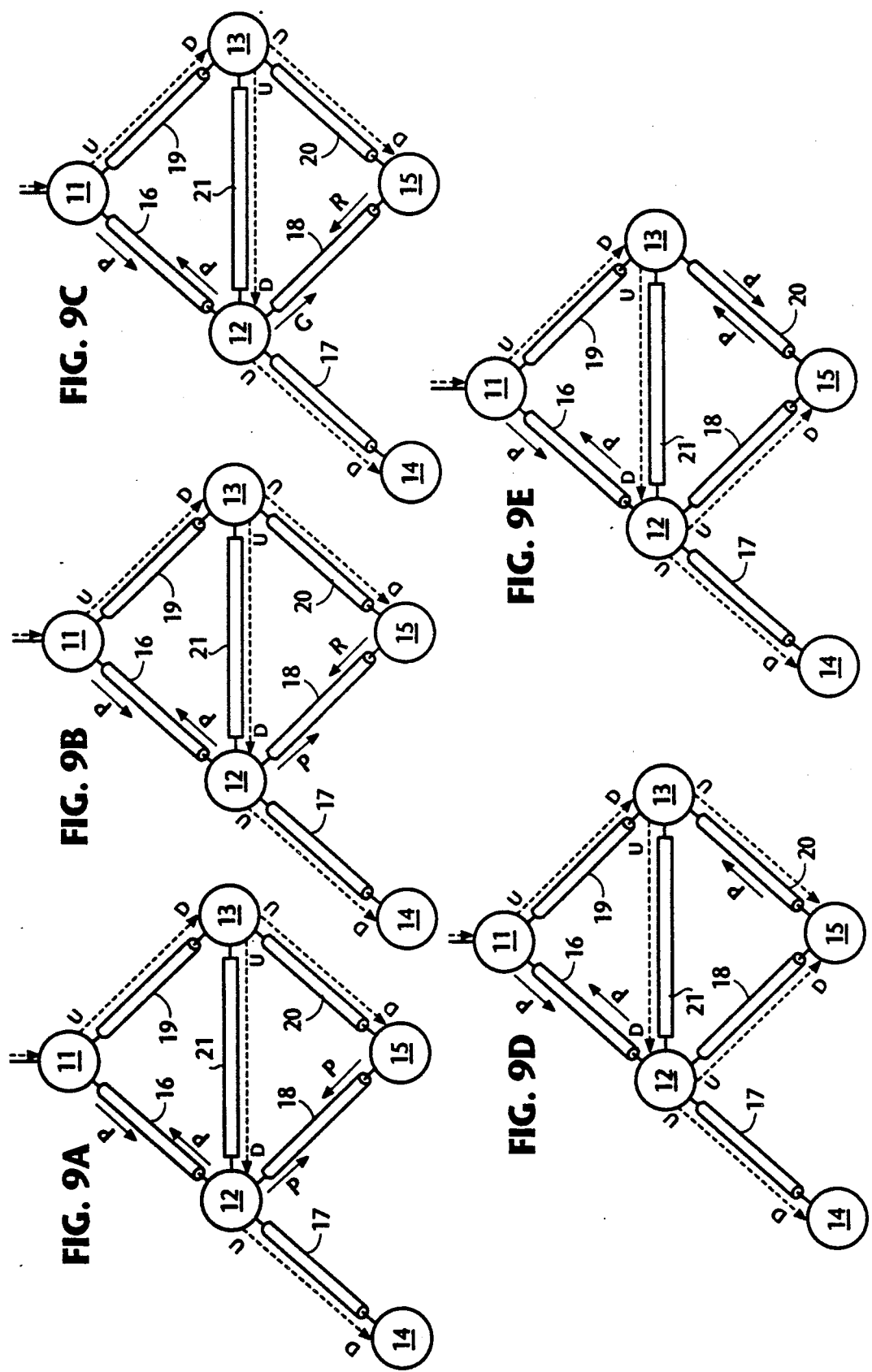

MULTIDROP CONTROL NETWORK COMMONLY USED FOR CARRYING NETWORK MANAGEMENT SIGNALS AND TOPOLOGY RECONFIGURATION SIGNALS

BACKGROUND OF THE INVENTION

The present invention relates generally to communications systems, and more specifically to a communications system in which switching nodes are interconnected by regular and spare (alternate) routes and in which a multidrop control network is formed, the topology of the multidrop control network being reconfigurable in the event of a line fault in the system.

A known data communication system comprises a network management center and a plurality of switching nodes each serving one or more user data terminals. The switching nodes and the network management center are interconnected by regular and spare transmission lines. Each transmission route includes a plurality of data channels which are connected to the data channels of other routes to form a data network for carrying users' signals. A management control channel is preassigned in each route for carrying a network management signal. The management control channels of regular routes are interconnected at the nodes so that a management control network is formed independently from the data network to transmit a network management signal from the center to each node. In addition to the management network, a system control channel is preassigned in each of the regular and spare routes. Each system control channel is connected to the system control channels of other regular and spare routes to form a system control network. In the event of a line fault in some route, control signals are exchanged between nodes through the system control network to reconfigure the system control network using a spare route instead of the faulty route. Since individual control channels are used for carrying signals other than data signals, it is desired to improve the utilization efficiency of the communications system.

SUMMARY OF THE INVENTION

It is therefore an object of the present invention to provide a communications system which reduces the amount of channels for carrying network control signals.

This object is obtained by a shared use of a multidrop control network for transporting network management signals and topology reconfiguration signals.

According to the present invention, the present invention provides a communications system which comprises a network management center, multiple switching nodes, and regular and spare routes interconnecting the nodes and connecting one of the nodes to the center. Each of the regular and spare routes comprises data channels and a control channel, the data channels of the regular routes forming a data network for carrying signals to and from user terminals and the control channel of each of the regular and spare routes is connected to the control channels of other regular and spare routes to form a control network of multidrop structure for carrying a network management signal from the center to the nodes as well as network response signals from the nodes to the center. Each of the nodes transmits a request signal through the control network in the even of a line fault in the transmission lines to request permission to establish a new regular route to an adjacent node and transmits a grant signal through the control network in response to receipt of a request signal from an adjacent node indicating that the request is granted if an alternate route is available. The control network is dynamically reconfigured in accordance with the presence and absence of the request signal and the grant signal which are received from adjacent nodes.

Preferably, each of the nodes selects one of the control channels of spare routes according to priorities given to a plurality of spare routes terminating to the node and transmits a request signal on the selected control channel.

Specifically, each of the switching nodes of the communications system includes a communication controller, a switch capable of establishing a branch connection between the control channels of the node and the communication controller for coupling a network management signal to the communication controller and transmitting an output signal from the communication controller to adjacent nodes downstream from the node and relaying a network response signal from the adjacent nodes to an upstream node. Transmit/receive units are provided for applying a request signal and a response signal to a selected control channel as a topology reconfiguration signal, and receiving a request signal and a response signal from adjacent nodes. A controller is provided for sequentially selecting one of the control channels of spare routes if a line fault occurs in a regular route and one of the transmit/receive units is enabled to apply a request signal to the selected control channel. The selected control channel is classified as a downstream end of a regular route if a response signal is received by the transmit/receive unit, and the control channels of spare routes other than the downstream-end control channel are classified as upstream ends of regular routes if a request signal is received from adjacent nodes. Except for the control channels which are classified as a downstream end and upstream ends of regular routes, other control channels of either spare or regular routes are classified as spare control channels. The switch is controlled in accordance with the classifications of the control channels to change the branch connection.

BRIEF DESCRIPTION OF THE DRAWINGS

The present invention will be described in further detail with reference to the accompanying drawings, in which:

FIG. 1 is a diagram of a data communication network embodying the present invention;

FIG. 4 is a view showing part of a switching node of FIG. 1 with respect to adjacent downstream nodes;

FIG. 5 is a view of a logical structure of the multidrop control network of the invention;

FIGS. 7A to 7D are views illustrating a process for reconfiguring a control network topology in the event of a single line fault;

FIGS. 9A to 9E are views illustrating another process for reconfiguring a control network topology in the event of a restart of a node.

DETAILED DESCRIPTION

Referring now to FIG. 1, there is shown a computer network comprising a network management center 10 and a plurality of switching nodes 11–15. Each switching node serves user data terminal equipments (DTE), not shown. Switching nodes 11–15 are interconnected by digital transmission lines 16–21, each being capable of carrying digital signals on a plurality of time slots, or full-duplex channels. All channels of each transmission line or route are divided into data channels for terminal-to-terminal communication and a control channel for carrying a center-to-node network management control signal, a node-to-center response signal as well as a node-to-node topology reconfiguration control signal.

Figure 2B:
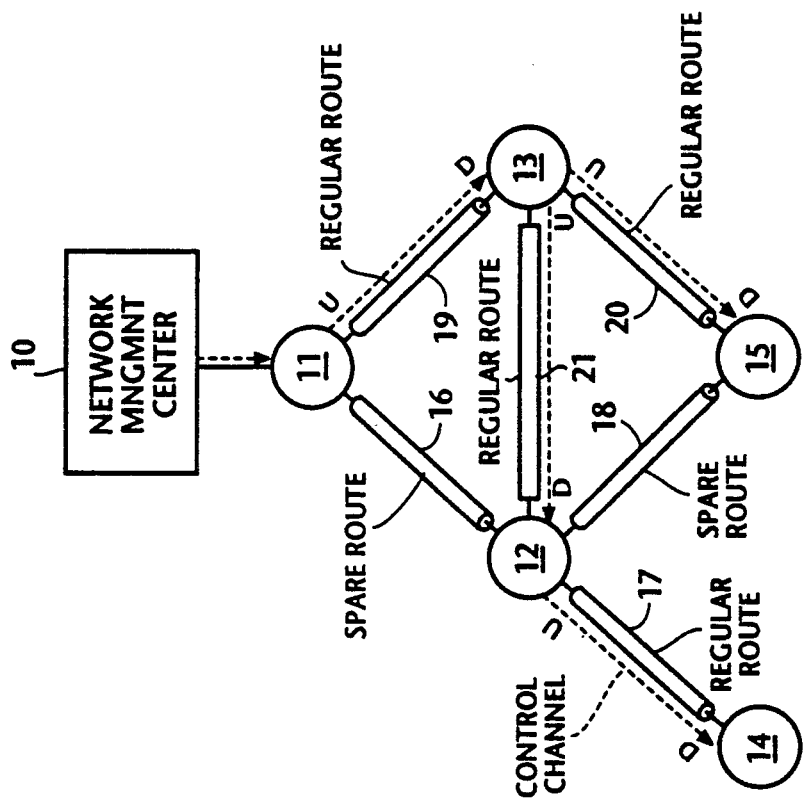
FIGS. 2A and 2B are diagrams showing typical examples of regular and spare routes and control channels.
Figure 2A:
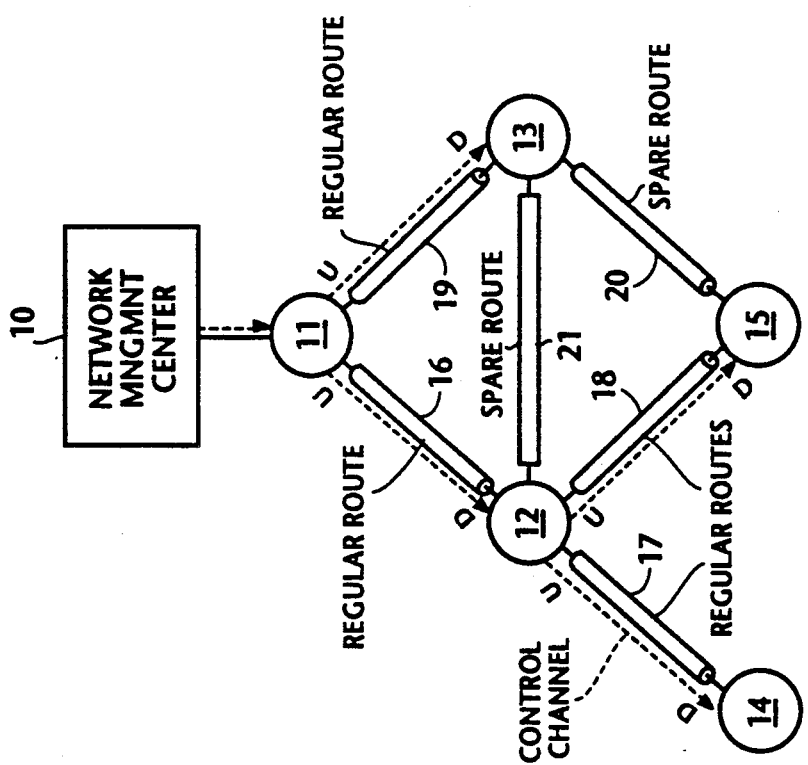

The transmission routes of the network are classified as regular routes and spare (alternate) routes. As typically shown in FIG 2A, transmission routes 16, 17, 18 and 19 are classified as regular routes, while routes 20 and 21 are classified as spare routes. The control channels from network management center 10 to all nodes are established over the regular routes as indicated by dotted lines and each node is classified as an upstream or downstream node in terms of the direction of network management signals from the network management center 10. One end of the regular control channel which is terminated to an upstream node is marked U to identify it as an upstream end of regular control channel and the other end which is terminated to a downstream node is marked D to identify it as a downstream end of the regular control channel. In the example of FIG. 2B, a logical multidrop structure is formed by branching out the control channel from center 10 at node 11 to downstream nodes 12 and 13 and branching out the control channel from node 11 at node 12 to downstream nodes 14 and 15. The direction of transmission of network management signals over a given route will change in dependence on the location of a line fault in the system and hence the classification of the ends of regular routes terminating to that given node changes accordingly.

Figure 3:
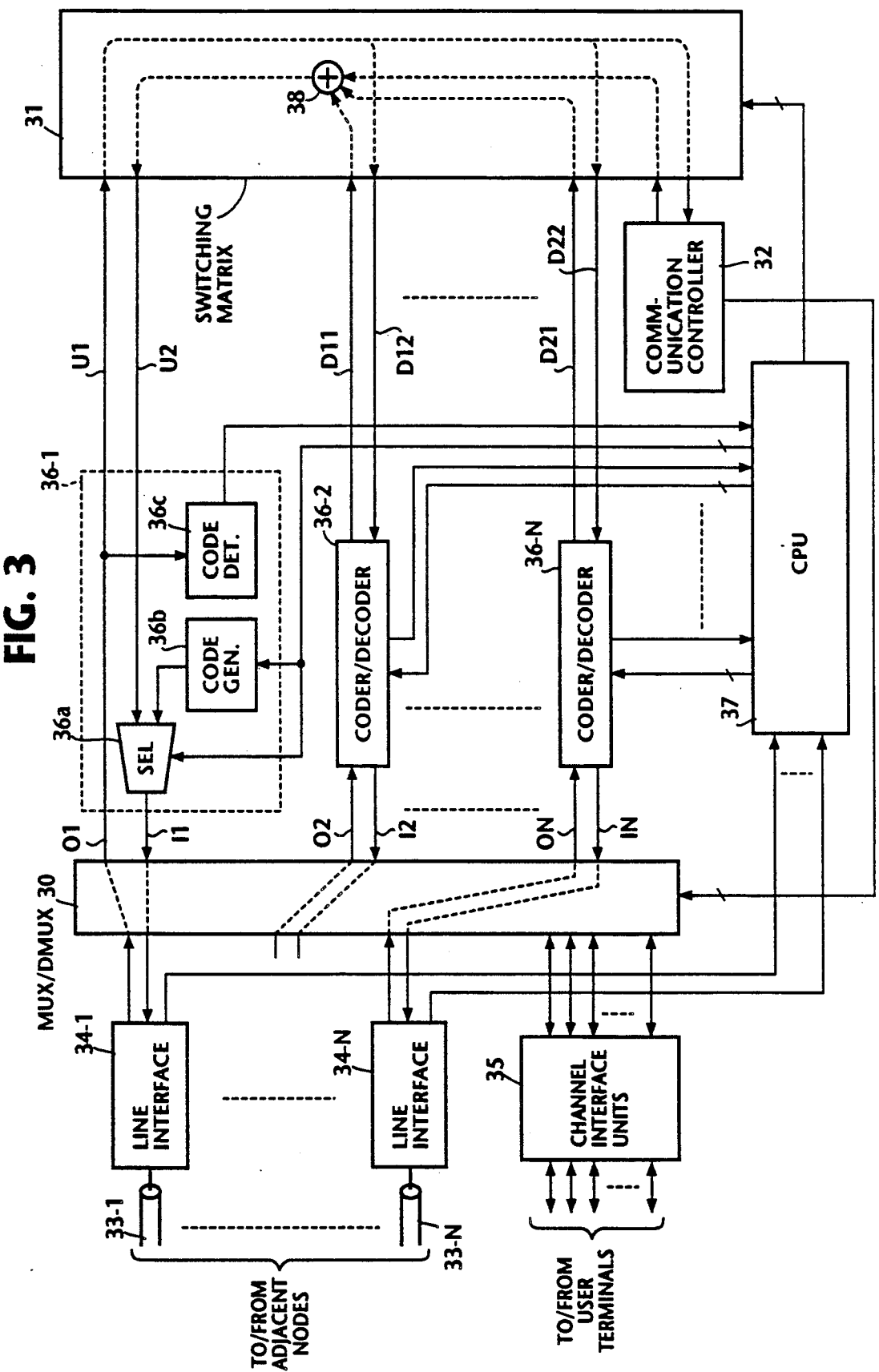
FIG. 3 shows details of each switching node of the data communication network.

As shown in FIG. 3, each switching node comprises a multiplexer/demultiplexer 30, a switching matrix 31 and a communication controller 32. Adjacent switching nodes and/or network management center are connected via transmission lines 33-1-33-N and terminated to associated line interface units 34-1-34-N, and user data terminals are terminated to respective channel interface units 35. Multiplexer/demultiplexer 30 operates as a time-division switch, or a time-slot interchanger, for establishing connections between line interface units 34 and channel interface units 35 in response to a network control signal which is transmitted from the network management center 10 and decoded by communication controller 32. One full-duplex channel is reserved for each transmission line (route) as a control channel. N control channels are therefore provided in the N routes, respectively, and the incoming paths and outgoing paths of the N control channels appear at output terminals O1–O4 and input terminals I1–IN, respectively, of multiplexer/demultiplexer 30. These control channels are connected to switching matrix 31 by way of N coder/decoder circuits 36-1-36-N. Switching matrix 31 establishes multidrop connections between the control channels terminating to it and communication controller 32 in response to a signal from the central processing unit 37 so that the control channel from network management center 10 is branched out at each upstream node to one or more downstream nodes as shown in FIG. 4 to form a control network of multidrop structure which logically appears as shown in FIG. 5.

Each of the coder/decoder circuits 36 includes a selector 36a, a code generator 36b and a code detector 36c. In response to a switching control signal from CPU 37, selector 36a selectively couples the outgoing path of the associated control channel from switching matrix 31 or the output of the code generator 36b to multiplexer/demultiplexer 30. As will be described, when a fault occurs in a transmission line, a line interface unit associated with it communicates this fact to CPU 37, which in turn selects a spare control channel of highest priority and directs the code generator 36b of the selected spare channel to send a node-to-node topology reconfiguration signal (request code) to an adjacent node to elicit a response (grant code) therefrom and establishes a new regular control channel. If no response is returned from the selected channel, CPU 37 repeats the process on successively lower priority spare control channels until all control channels are searched. If the attempt fails, CPU 37 then searches regular control channels starting with highest priority. If the request is granted, CPU 37 alters the switched connections of matrix 31.

Each of the nodes 11 to 15 classifies the near end of each control channel as an upstream-end of regular control channel (URG), a downstream-end of regular control channel (DRG), or a spare control channel (SPR). The center-to-node network management signal is protocol-terminated, or decoded by the communication controller 32 of a branching node before being distributed to downstream nodes, and node-to-center response signals from the downstream nodes are relayed by the branching node toward the center 10 without protocol termination. Assume that a center-to-node network management signal appearing on incoming path U1 from an upstream node is to be sent to two downstream nodes, switching matrix 31 establishes an up-to-down connection from path U1 to outgoing paths D12 and D22 leading to the associated downstream nodes for downward distribution as well as to the input of communication controller 32 for protocol termination. Switching matrix 31 further establishes down-to-up connections from incoming paths D11 and D21 and the output of communication controller 32 through a summing element 38 to outgoing path U2 to relay node-to-center response signals from these downstream nodes as well as from the communication controller 32 to the upstream node. The effect of summing element 38 is to prevent the response signal of each channel from entering the coder/decoder of adjacent channel. With the switched connections established, in this way, all center-to-node network management signals as well as node-to-node topology reconfiguration signals can be relayed from an upstream node to downstream nodes without protocol termination except for those directed to the own node. This is advantageous for speeding up the transmission of signals.

As will be described, if a given node has a spare control channel to an adjacent node, pilot signals are constantly exchanged through the spare control channel as a node-to-node topology reconfiguration control signal to indicate that each of these nodes is establishing a regular control channel to an upstream node and a new control channel is available. If trouble occurs, in the regular transmission line 16, for example, node 12 will detect this fact, select a control channel according to assigned priority and send a request code to an adjacent node over the selected control channel asking permission to establish a new control channel. Top priority is given to a spare control channel for the channel selection. If no spare control channel is available, priority is given to regular control channels. Note that the request code indicates that the requesting node is ready to serve as a downstream node with respect to the requested node. In response to a request code, the requested node returns a grant code if a new control channel is available. On receiving a grant code, the requesting node and the adjacent nodes reconfigure the multidrop network topology such as shown in FIG. 2B, by controlling their switching matrices 31.

Figure 6A:
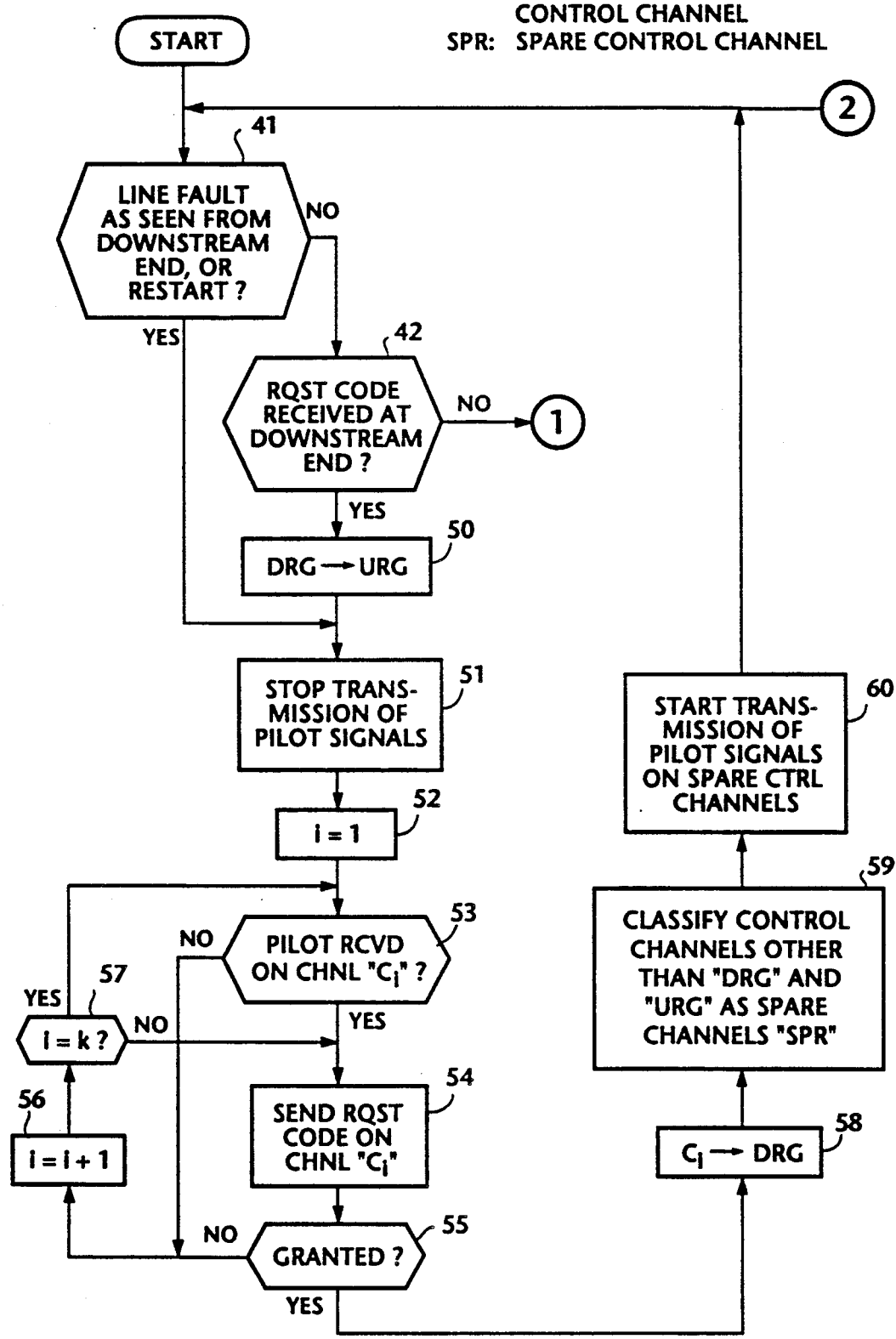
FIGS. 6A and 6B are flowcharts describing operations performed by the central processing unit of each switching node.
Figure 6B:
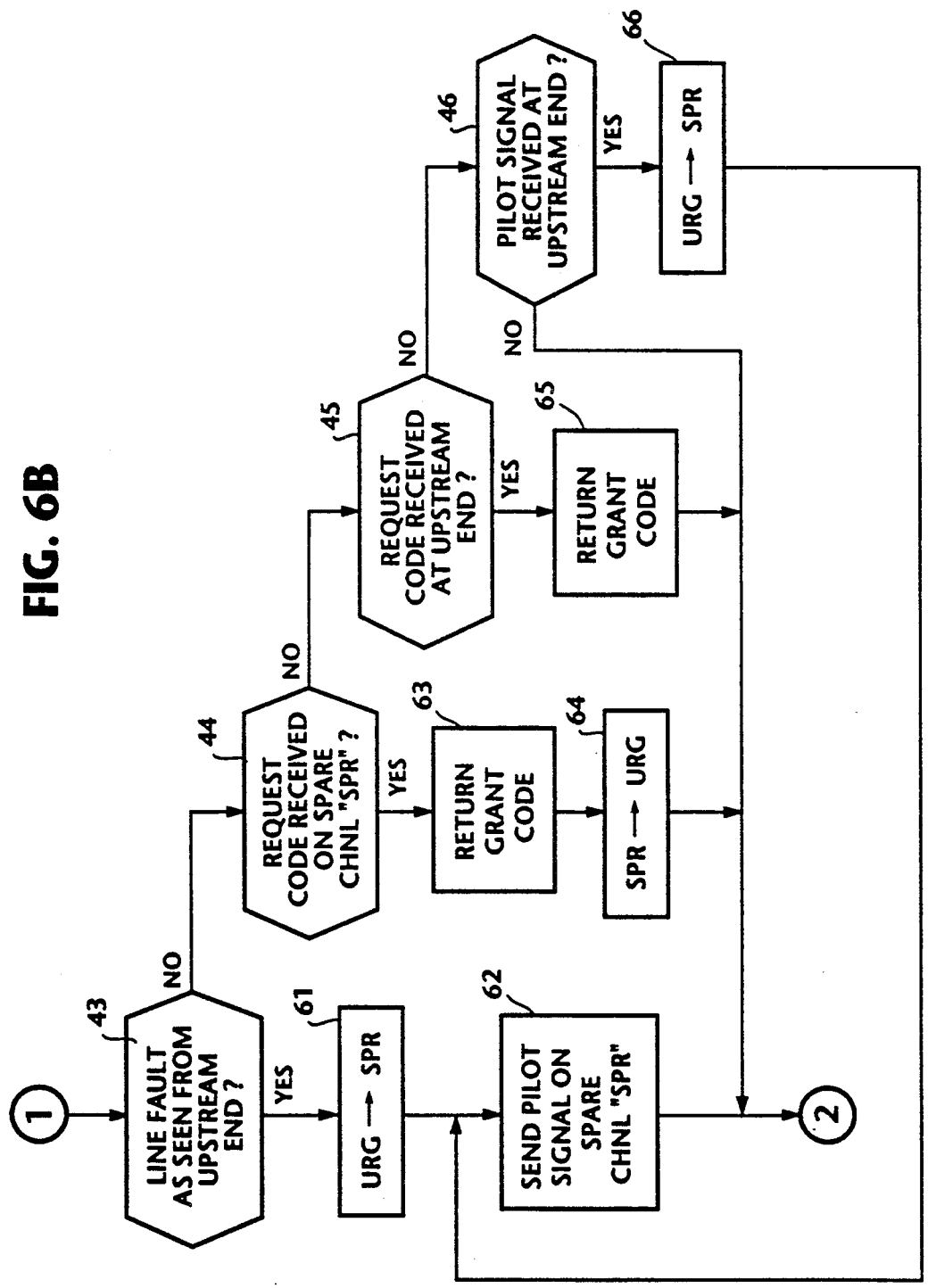

Referring to FIGS. 6A and 6B, the CPU 37 of each node is programmed to execute instructions for altering control network topology in the event of a line fault in the system. CPU 37 of each node loops through steps 41 to 46 to search for an event that needs immediate attention by the node. In each node, program execution starts with step 41 which checks to see if there is a line fault in its route as seen from a downstream end or if the node of interest is restarted for hunting a new route. If this is the case, control exits to step 51 to stop transmission of pilot signals and goes to step 52 to set variable i to 1. Exit then is to step 53 to check for the presence of a pilot signal on a control channel $C_l$. If the answer is negative, control exits to step 56 to increment variable i by one and moves through step 57 to step 53 to check for the presence of a pilot signal on the next priority control channel $C_{l+1}$. If the answer is affirmative in step 53, exit is to step 54 to send a request code on control channel $C_l$ to an adjacent node. Exit then is to decision step 55 to check to see if a grant code is returned from the adjacent node. If no grant code is received within a specified period of time, a negative decision is made in step 55, and steps 56 and 57 are executed to shift the check point to the next priority route until l is equal to k which represents the number of routes of the node currently classified as spare routes. If a grant code is received from a requested node, control exits the loop and enters step 58 to set variable $C_l$ to DRG indicating that the near end of control channel $C_l$ is classified as a downstream end and the route is classified as regular route.

If a request is granted, it means that the node issuing the request is prepared to act as a downstream node with respect to the requested node, and control exits to step 58 to reclassify the near end of the control channel on which the request is sent as a downstream end of regular control channel. If the number of instances in which no pilot signal and/or no grant code are received exceeds a preset value k in step 57, it means that no further spare control channels are available and control returns to step 53 to repeat the process.

Exit then is to step 59 to classify control channels other than those classified as downstream (DRG) and upstream (URG) ends as spare routes (SPR). Control advances to step 60 to start transmitting pilot signals on the spare control channels classified in step 59, and returns to the starting point of the program.

Transmission of a grant code occurs in a node if it receives a request code on a spare channel (case 1), or received at an upstream end of a regular control channel (case 2), or received at a downstream end of a regular control channel (case 3). Case 1 occurs if a requested node is executing step 44 and control exits to step 63 which simply directs the transmitting of a grant code on the spare control channel SPR on which the request code was received and goes to step 64 to set the classification of the channel to an upstream end of regular control channel URG. Case 2 occurs if the requested node is executing step 45 and control proceeds to step 65 to return a grant code. Case 3 takes place if the requested node is executing step 42 and control moves ahead to step 50 to change the classification of the near end of the regular route on which the request code was received to an upstream end, and then enters the loop comprising steps steps 51 to 60.

Assume that the initial state of the system is as shown in FIG. 7A and a line fault occurs on route 16 as marked by "X" in FIG. 7B. Node 12 ceases transmission of pilot signal P on route 21 as it executes step 51 and sends a request code R to node 13 on route 21 (step 54). On receiving this request code on a spare control channel, node 13 makes an affirmative decision in step 44 and exits to step 63 to return a grant code to node 12 (FIG. 7C). On receiving this grant code, node 12 exits to step 58 to classify the near end of spare control channel 21 as a downstream end. Using the information obtained by steps 58 and 59, nodes 12 and 13 control their switching matrices 31 so that control channel on route 19 at node 13 is connected to control channel on route 21 which is, in turn, branched out at node 12 to control channels on routes 17 and 18 as shown in FIG. 7D. Node 12 then starts transmitting a pilot signal (step 60) to wait for the recovery of the fault on route 16. .

Figure 8C:
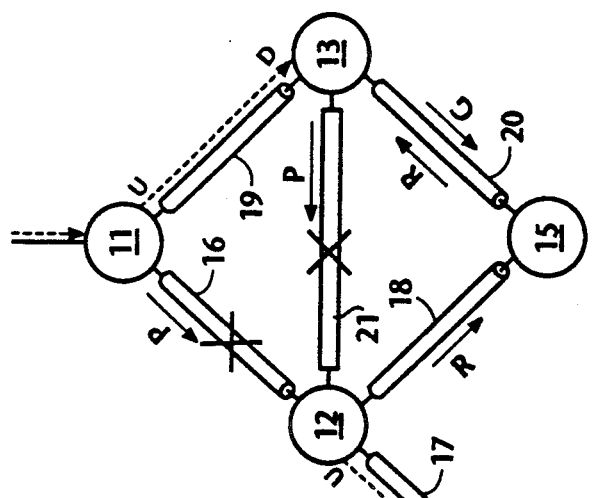
FIGS. 8A to 8F are views illustrating a process for reconfiguring a control network topology in the event of two line faults.
Figure 8B:
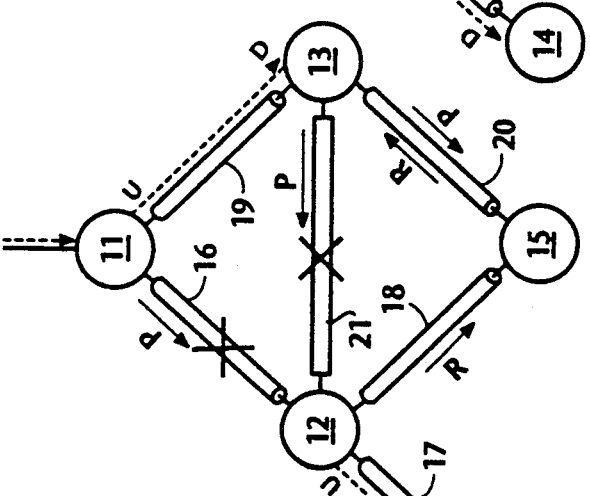
Figure 8A:
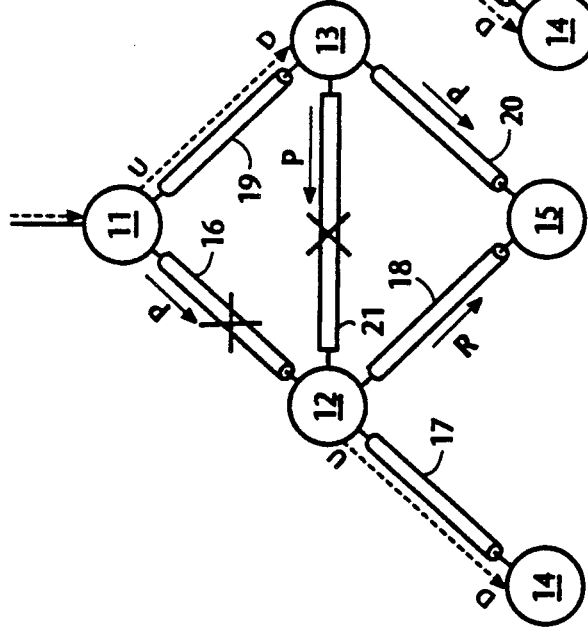

If a line fault is further detected on spare route 21 as well as on regular route 16 as marked in FIG. 8A, node 12 ceases transmission of pilot signal P on route 21 (step 51) and sends a request code R from node 12 to node 15 on route 18 as the latter is of the next priority to the faulty route 16. On detecting a fault on the upstream end of a regular route, node 11 exits from step 43 to step 61 to classify route 16 as a spare route SPR and moves to step 62 to send a pilot signal on the spare route 16.

Figure 8F:
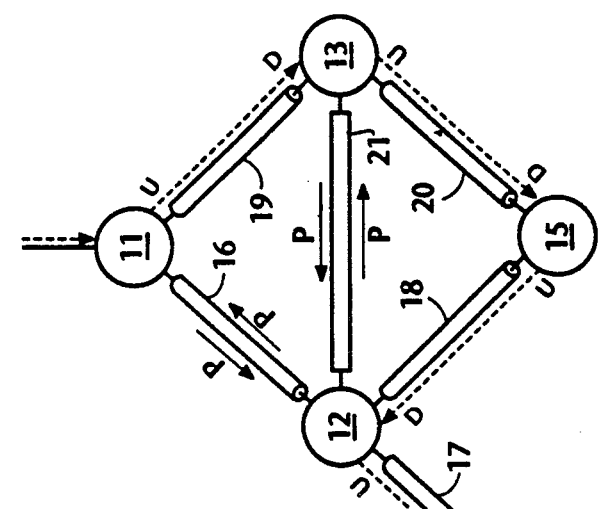
Figure 8E:
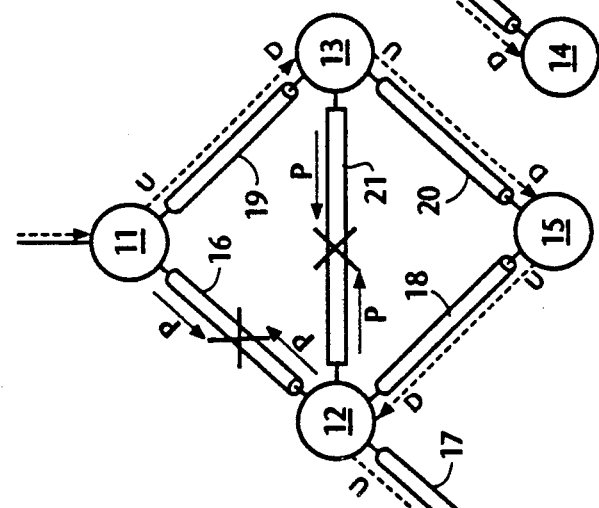
Figure 8D:
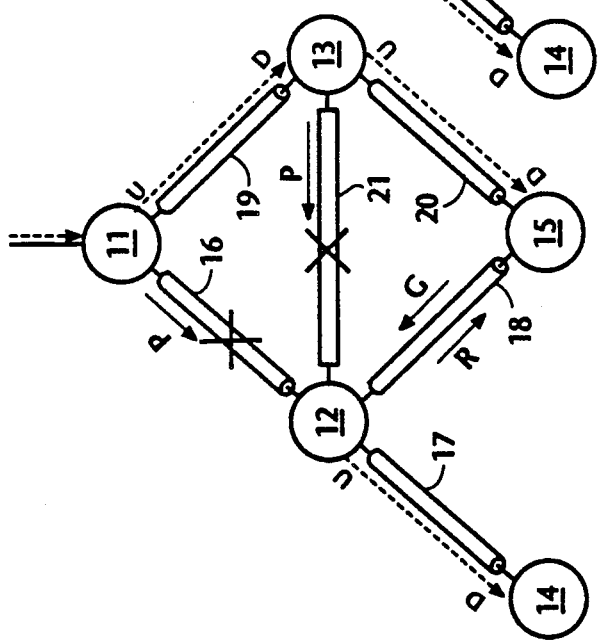

On receiving a request at a downstream end of route 18, control of node 15 exits from step 42 to step 50 to reclassify the downstream end of route 18 as an upstream end and goes to step 51 to cease transmission of pilot signal which has been sent to node 13 on spare route 20 and sends a request code R to node 13 (step 54) on route 20 (FIG. 8B). Since this request code is received on a spare control channel, node 13 makes an affirmative decision in step 44 and exits to step 63 to return a grant code G to the requesting node 15 (FIG. 8C) and node 13 classifies the near end of route 20 as an upstream-end of regular route in step 64. Since the downstream end of route 18 has been reclassified by node 15 as an upstream end in step 50, the request code from node 12 to node 15 causes the latter to move through step 45 to step 65 to return a grant code to the requesting node 12 (FIG. 8D). On receipt of this grant code from node 15, node 12 classifies the near end of route 18 as a downstream end in step 58 (FIG. 8E).

As a result of the classifications in steps 58 and 59 of each of the above nodes, switching matrices of nodes 12, 13 and 15 are controlled to establish a connection at node 13 between control channels of routes 19 and 20, a connection at node 15 between control channels of routes 18 and 20 and a connection at node 12 between control channels of routes 18 and 17. When the line faults are recovered, the multidrop network topology will appear as shown in FIG. 8F in which the recovered routes 16 and 21 are classified as spare routes and pilot signals are exchanged between nodes 11 and 12 over route 16 and between nodes 12 and 13 over route 21.

Assume further that the control network initially appears as shown in FIG. 9A in which routes 16 and 18 are spare routes and pilot signals are exchanged over the spare routes. If node 15 is restarted and begins hunting a new regular route and a new spare route, CPU 37 of node 15 moves through step 41 to step 51 to stop transmission of pilot signal and moves through steps 52 and 53 to step 54 to send a request code and exits to step 55. If route 18 is assigned priority higher than the priority of route 20, the request code is send on route 18 to node 12 (FIG. 9B). On receiving this request code on a spare route, node 12 exits from step 44 to step 63 and returns a grant code to node 15 (FIG. 9C) and classifies the near end of route 18 as an upstream end in step 64. In response to this grant code, node 15 exits from step 55 to step 58 to classify its near end of route 18 as a downstream end of regular route, establishing a new regular route between nodes 12 and 15 (FIG. 9D) and classifies route 20 as a spare route in step 59 and transmits a pilot signal on route 20 to node 13 upon step 60. In receipt of this pilot signal at an upstream end of a regular route, node 13 exits from step 46 to step 66 to change the classification of the route 20 as a spare route and proceeds to step 62 to return a pilot signal on this spare route to node 15 (FIG. 9E).

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A communications system, comprising:
  a network management center;
  a plurality of nodes;
  a network control channel between said network management center and said nodes; and
  a plurality of regular and spare routes interconnecting said nodes and connecting one of said nodes to said center, each of said regular and spare routes comprising data channels and control channels said data channels of said regular routes forming a data network for carrying signals to and from user terminals, and characterized in that each of said nodes includes switch means for establishing a branch connection between a specific one of said control channels in one of said regular roues and other said control channels in said regular routes to form a common-channel control network having a multi-drop structure for carrying a network management signal from said center to said nodes as well as network response signals from said nodes to said center, and means for transmitting a pilot signal provided on said control channels in said spare routes to an adjacent one of said nodes for monitoring an availability of one of said spare-route control channels transmitting a request signal to said adjacent node through said one of the spare-route control channels on which the pilot signal is detected in the event of a line fault in said transmission lines to request permission for establishing a new regular route to said adjacent node and returning a grant signal in response to receipt of said request signal indicating that said request is granted, and controlling said switch means to change said branch connection in accordance with the presence and absence of a received version of said request signal and a received version of said grant signal.

2. A communications system comprising:
  a network management center; and
  a plurality of switching nodes interconnected by transmission lines, said transmission lines being classified as regular routes and spare routes, each of said transmission lines having a plurality of data channels for carrying signals to and from user terminals and a network control channel between said network management center and one of said nodes, each of said switching nodes having a plurality of control channels on said regular and spare routes,
  each of said switching nodes further comprising:
  a communication controller;
  switch means for establishing a branch connection between one of said control channels on said regular routes of one of the nodes and said communication controller to form a common-channel multidrop control network for coupling a network management signal from said center to said communication controller and transmitting an output signal from said communication controller to said nodes adjacent and downstream from the one of said nodes and relaying a network response signal from the adjacent nodes to said center; and
  control means for;
    a) transmitting a pilot signal on a spare-route control channel, said spare-route control channel being a specific one of said control channels on said spare routes and monitoring availability of said spare-route control channel;
    b) transmitting a request signal on the spare-route control channel if the pilot signal is detected thereon, and returning a grant signal in response to the request signal;
    c) classifying the spare-route control channel as a downstream end of said regular routes if the grant signal is received thereon, and classifying the spare-route control channel as an upstream end of said regular routes if the request signal is received thereon;
    d) classifying said control channels other than said classified control channels as spare route control channels; and
    e) controlling said switch means to change said branch connection in accordance with the classification of said control channels.

3. A communications system as claimed in claim 2, wherein said switch means establishes connections from an upstream node to downstream nodes and a connection from said upstream node to an input of said communication controller, and establishes connections from said downstream nodes to said upstream node and a connection from an output of said communication controller to said upstream node.

4. A communication system comprising:
  a network management center; and
  a plurality of switching nodes interconnected by transmission lines, said transmission lines being classified as regular routes and spare routes, each of said transmission lines having a plurality of data channels for carrying signals to and from user terminals and a network control channel between said network management center and said switching nodes, each of said switching nodes having a plurality of control channels on said regular and spare routes;

each of said switching nodes further comprising:

a communication controller;

switch means for establishing a branch connection between said control channels of one of the nodes and said communication controller to form a common-channel multidrop control network for coupling a network management signal from said center to said communication controller and transmitting an output signal from said communication controller to nodes adjacent and downstream from the one of said nodes and relaying a network response signal from the adjacent nodes to said center; and control means programmed to perform the functions of:
- a) detecting when a line fault occurs in one of said regular or spare routes as seen from an end of the routes classified as a downstream end of each of said regular routes or detecting that a request signal is received at said downstream end and stopping transmission of a pilot signal on one of said spare routes;
- b) detecting if said pilot signal is received on one of said spare routes;
- c) if the answer in the function (b) is negative, repeating the function (b) on a specific one of said spare routes having a lower priority, and if the answer in the function (b) is affirmative, transmitting said request signal on the one of said spare routes on which said pilot signal is detected by the function (b);
- d) detecting if a grant signal is detected on the last-mentioned one of said spare routes;
- e) if the answer in the function (d) is negative, repeating the functions (b) to (d), and if the answer in the function (d) is affirmative, classifying one of the control channels of the one of said spare routes on which said grant signal is detected by the function (d) as a downstream end of the one said regular routes;
- f) detecting that said request signal is received on the one of said spare routes and transmitting back said grant signal on said one of said spare routes;
- g) classifying the one of said control channels of the one of said spare routes of the function (f) as an upstream end of said one of the regular routes;
- h) classifying the control channels other than those classified by the functions (e) and (g) as spare control channels;
- i) repeating the functions (a) to (h); and
- j) controlling said switch means according to the classifications of said control channels.

5. A communications system as claimed in claim 4, wherein the function (a) further comprises:
- a) detecting that said line fault occurs in said upstream end of said one of the regular routes, classifying the last-mentioned route as a new spare route and transmitting said pilot signal on said new spare route;
- b) detecting that said request signal is received at one end of one of said routes which is classified as an upstream end of said one of the regular routes, and transmitting back said grant signal; and
- c) detecting that said pilot signal is received at one end of said one of said routes which is classified as an upstream end of the regular routes classifying the last-mentioned route as said new spare route, and transmitting thereon said pilot signal.

6. A communications system comprising:

a network management center; and a plurality of switching nodes interconnected by digital transmission lines, one of said switching nodes being connected to said network management center, said transmission lines being classified as regular routes and spare routes, each of said transmission lines having a plurality of data time slots for carrying signals to and from user terminals and a control time slot for carrying a network management signal from said network management center to each of said nodes and a topology reconfiguration signal between adjacent nodes, each of said switching nodes having a plurality of control time slots on said regular and spare routes, each of said switching nodes comprising:

time-division switch means for interchanging between incoming data time slots of said transmission lines terminating to the node and outgoing data time slots of said terminating transmission lines to establish a data network, said time-division switch means having a plurality of output terminals at which incoming control time slots of said transmission lines appear and a plurality of corresponding input terminals at which outgoing control time slots of said transmission lines appear;

a communication controller;

space-division switch means capable of establishing a branch connection between the input and output terminals of said time-division switch means and said communication controller for coupling said network management signal from said output terminals to said communication controller and coupling an output signal from said communication controller to said input terminals of said time-division switch means;

transmit/receive means capable of applying a request signal and a response signal to said input terminals of said time-division switch means as said topology reconfiguration signal, and receiving a said request signal and a said response signal from adjacent nodes through said output terminals of the time-division switch means; and control means for sequentially selecting one of the input terminals of said time-division switch means associated with the spare routes of the node if of the regular routes, causing said transmit/receive means to apply said request signal to the selected input terminal, classifying said input terminal as one of said downstream end of a regular routes if said response signal is received by said transmit/receive means, classifying the input terminals associated with the spare routes other than said classified input terminal as upstream ends of regular routes if said request signal is received, classifying the input terminals of either regular or spare routes as spare routes except for the input terminals which are classified as a downstream end and upstream ends of regular routes, and controlling said space-division switch means to change said branch connection in accordance with the classifications of said input terminals.

7. A communications system as claimed in claim 6, wherein said transmit/receive means is capable of transmitting a pilot signal to adjacent nodes and receiving said pilot signal from said adjacent nodes, wherein said control means causes said transmit/receive means to send said pilot signal on a control time slot of one of said spare routes and monitors said transmit/receive means to detect if said pilot signal is received on said control time slot of said one of the spare routes said control means selecting one of the input terminals of said time-division switch means if said pilot signal is detected on the output terminal which corresponds to said selected input terminal, following the occurrence of said line fault.

8. A communications system as claimed in claim 6, wherein said transmit/receive means comprises a plurality of coder/decoder units respectively connected to the input and output terminals of said time-division switch means.

9. A communications system as claimed in claim 6, wherein said space-division switch means establishes connections from the input terminal of said time-division switch means which is associated with an upstream node to the output terminals of said time-division switch means which are associated with downstream nodes and a further connection from the last-mentioned input terminal to an input of said communication controller, and establishes connections from the last-mentioned output terminals to said input terminal and a connection from an output of said communication controller to said input terminal.

10. A communications system comprising:
a network management center; and
a plurality of switching nodes interconnected by digital transmission lines, one of said switching nodes being connected to said network management center, said transmission lines being classified as regular routes and spare routes, each of said transmission lines having a plurality of data time slots for carrying signals to and from user terminals and a control time slot for carrying a network management signal from said network management center to each of said nodes and a topology reconfiguration signal between adjacent nodes, each of said switching nodes having a plurality of control time slots on said regular and spare routes, each of said switching nodes comprising:
time-division switch means for interchanging between incoming data time slots of said transmission lines terminating at the switching nodes and outgoing data time slots of said terminating transmission lines to establish a data network with other switching nodes, said time-division switch means having a plurality of output terminals at which incoming control time slots of said transmission lines appear and a plurality of corresponding input terminals at which outgoing control time slots of said transmission lines appear;
a communication controller;
space-division switch means capable of establishing a branch connection between the input and output terminals of said time-division switch means and said communication controller for coupling said network management signal from said output terminals to said communication controller and coupling an output signal from said communication controller to said input terminals of said time-division switch means; and
control means programmed to perform the functions of:
a) detecting when a line fault occurs in a one of said regular or spare routes as seen from an end of the routes classified as a downstream end of each of said regular routes or detecting that a request signal is received at said downstream end and stopping transmission of a pilot signal on one of said spare routes;
b) detecting if said pilot signal is received on one of said spare routes;
c) if the answer in the function (b) is negative, repeating the function (b) on a specific one of said spare routes having a lower priority, and if the answer in the function (b) is affirmative, transmitting said request signal on the one of said spare routes on which said pilot signal is detected by the function (b);
d) detecting if a grant signal is detected on the last-mentioned one of said spare routes;
e) if the answer in the function (d) is negative, repeating the functions (b) to (d), and if the answer in the function (d) is affirmative, classifying one of the control channels of the one of said spare routes on which said grant signal is detected by the function (d) as a downstream end of the one said regular routes;
f) detecting that said request signal is received on the one of said spare routes and transmitting back said grant signal on said one of said spare routes;
g) classifying the one of said control channels of the one of said spare routes of the function (f) as an upstream end of said one of the regular routes;
h) classifying the control channels other than those classified by the functions (e) and (g) as spare control channels;
i) repeating the functions (a) to (h); and
j) controlling said switch means according to the classifications of said control channels.

11. A communications system as claimed in claim 10, wherein the function (a) further comprises:
A) detecting that said line fault occurs in said upstream end of said one of the regular routes, classifying the last-mentioned route as a new spare route and transmitting said pilot signal on said new spare route;
B) detecting that said request signal is received at one end of one of said routes which is classified as an upstream end of said one of the regular routes, and transmitting back said grant signal; and
C) detecting that said pilot signal is received at one end of said one of said routes which is classified as an upstream end of the regular routes classifying the last-mentioned route as said new spare route, and transmitting thereon said pilot signal.

* * * * *